US009861116B2

(12) United States Patent
Al-Murrani

(10) Patent No.: US 9,861,116 B2
(45) Date of Patent: Jan. 9, 2018

(54) PET FOOD COMPOSITIONS FOR INDUCING A SATIETY RESPONSE

(75) Inventor: Samer Al-Murrani, Topeka, KS (US)

(73) Assignee: Hill's Pet Nutrition, Inc., Topeka, KS (US)

( * ) Notice: Subject to any disclaimer, the term of this patent is extended or adjusted under 35 U.S.C. 154(b) by 0 days.

(21) Appl. No.: 13/995,183

(22) PCT Filed: Nov. 23, 2011

(86) PCT No.: PCT/US2011/061998
§ 371 (c)(1),
(2), (4) Date: Jun. 18, 2013

(87) PCT Pub. No.: WO2012/087487
PCT Pub. Date: Jun. 28, 2012

(65) Prior Publication Data
US 2013/0280352 A1 Oct. 24, 2013

Related U.S. Application Data

(60) Provisional application No. 61/425,008, filed on Dec. 20, 2010.

(51) Int. Cl.
*A61K 36/81* (2006.01)
*A61K 36/185* (2006.01)
*A23K 1/16* (2006.01)
*A23K 20/174* (2016.01)
*A23K 20/105* (2016.01)
*A23K 20/111* (2016.01)
*A23K 20/10* (2016.01)
*A23K 50/40* (2016.01)
*A23K 50/48* (2016.01)

(52) U.S. Cl.
CPC ............ *A23K 1/1612* (2013.01); *A23K 20/10* (2016.05); *A23K 20/105* (2016.05); *A23K 20/111* (2016.05); *A23K 20/174* (2016.05); *A23K 50/40* (2016.05); *A23K 50/48* (2016.05)

(58) Field of Classification Search
CPC .......................... A61K 2300/00; A61K 31/05
USPC ........................................................ 424/725
See application file for complete search history.

(56) References Cited

U.S. PATENT DOCUMENTS

| | | | |
|---|---|---|---|
| 5,908,830 A | 6/1999 | Smith et al. | |
| 5,989,920 A | 11/1999 | Gerald et al. | |
| 6,133,323 A | 10/2000 | Hayek | |
| 6,511,984 B2 | 1/2003 | Elliott | |
| 6,605,437 B2 | 8/2003 | Kleyn et al. | |
| 7,166,611 B2 | 1/2007 | Van Heerden et al. | |
| 7,608,245 B2 | 10/2009 | Lin | |
| 7,723,471 B2 | 5/2010 | Levy et al. | |
| 2002/0128324 A1 | 9/2002 | Sunvold et al. | |
| 2005/0003026 A1* | 1/2005 | Bok et al. | 424/736 |
| 2005/0013849 A1* | 1/2005 | Lemaure | A61K 36/48 424/442 |
| 2007/0202211 A1 | 8/2007 | Altom et al. | |
| 2007/0244202 A1 | 10/2007 | Murase | |
| 2010/0048723 A1 | 2/2010 | Yamka et al. | |
| 2011/0236413 A1* | 9/2011 | Oben | A61K 36/185 424/195.17 |

FOREIGN PATENT DOCUMENTS

| | | | |
|---|---|---|---|
| CN | 1253498 | | 5/2000 |
| CN | 1685976 A | | 10/2005 |
| CN | 101167538 A | * | 4/2008 |
| CN | 101389321 | | 3/2009 |
| CN | 101394751 | | 3/2009 |
| CN | 101396068 | | 4/2009 |
| CN | 101822327 A | | 9/2010 |
| DE | 202008002263 | | 5/2008 |
| EP | 1388297 | | 2/2004 |
| EP | 1388297 A1 | * | 2/2004 |
| GB | 2462484 | | 2/2010 |
| JP | S60-126037 A | | 7/1985 |
| JP | 2001187732 | | 7/2001 |
| JP | 2005517419 | | 6/2005 |
| JP | 2006-094793 | | 4/2006 |
| JP | 2006527585 | | 12/2006 |
| JP | 2008231080 A | * | 10/2008 |
| JP | 2008280281 A | * | 11/2008 |
| JP | 2009-013123 | | 1/2009 |
| JP | 2010-024208 | | 2/2010 |
| WO | 2002076235 | | 10/2002 |
| WO | WO 2004/110164 | | 12/2004 |
| WO | WO 2006/013602 | | 2/2006 |
| WO | WO 2007/008548 | | 1/2007 |
| WO | WO 2007/009657 | | 1/2007 |
| WO | WO 2007/112366 | | 10/2007 |
| WO | WO2008103179 A | * | 8/2008 |

(Continued)

OTHER PUBLICATIONS

AAFCO, 2003, American Association of Feed Control Officials Official Publication, pp. 126-140.
Beck, 2006, "Neuropeptide Y in normal eating and in genetic and dietary-induced obesity," Philosophical Transactions of the Royal Society B 361(1471):1159-1185.
Chamorro et al., 2002, "Appetite suppression based on selective inhibition of NPY receptors," International J. of Obesity 26(3):281-298.
Dal-Pan et al., 2010, "Resveratrol Suppresses Body Mass Gain in a Seasonal Non-Human Primate Model of Obesity," BMC Physiology 10(11):1-10.
Dunne et al., 2009, "Colour of Bovine Subcutaneous Adipose Tissue: A Review of Contributory Factors, Associations with Carcass and Meat Quality and Its Potential Utility in Authentication of Dietary History," Meat Science 81(1):28-45.
Hosokawa et al., 2008, "Anti-Obesity Activator for e.g. Foodstuffs, Cosmetics, Fertilizer or Pharmaceutical Comprises Carotenoid Which Has Allene Structure as Active Ingredient," Database WPI, Accession No. 2008-N93794.

(Continued)

Primary Examiner — Chris R Tate
Assistant Examiner — Randall Winston

(57) ABSTRACT

The invention relates to pet food compositions designed to induce the animal to cease feeding upon consumption of the appropriate nutritional amount. The invention further provides methods of inducing satiety response in animals and methods of controlling the amount of food intake in animals.

4 Claims, No Drawings

(56) References Cited

FOREIGN PATENT DOCUMENTS

| WO | WO 2009/046964 | 4/2009 |
|----|----------------|--------|
| WO | WO 2009/128930 | 10/2009 |

OTHER PUBLICATIONS

International Search Report and Written Opinion in International Application No. PCT/US11/061998, dated May 31, 2012.
Inui et al., 1991, "Neuropeptide regulation of feeing in dogs," The American Journal of Physiology 261(3 Pt. 2):R588-R594.
Liang, 2010, "Pet Food, Useful e.g. for Nursing Heart of Pets, Comprises Lean Meat, Glycerol, Rosemary Oil, Spanish Bayonet, Mineral Matter, Vitamin E, Vitamin C, Taurine, Dandelion Oil, Flax-Seed Oil, Helianthus Oil, and Tomato Powder," Database WPI, 2010, Accession No. 2010-M39062.
Mitsuhashi et al., 2010, "Lipid Metabolism and Satiety with Dietary Fiber and Carnitine in Obese Dogs," J. Vet. Int. Med. 24(3):718 Abstract #155.
Written Opinion in International Application No. PCT/US11/061998, dated Mar. 11, 2013.
Yan et al., 2006, "Liposoluble Composite Vitamin Microelement and Manufacturing Method," Database WPI, Accession No. 2006-174597, CN1685976.
Itou, et al., 2000, "Effects of Long-Term Administration of β-Carotene Extracted from Dunaliella Bardawil (Dunaliella β-Carotene) on Rats," Vitamins 74(4):212.
Jilin Entry-Exit Inspection and Quarantine Bureau et al., 2009, "Research on pet obesity and prevention and alleviation of pet obesity," China Animal Health pp. 101-106.
Murano et al., "Morphology of ferret subcutaneoius adipose tissue after 6-month daily supplementation with oral beta-carotene," Biochimica et Biophysica Acta, Molecular Basis of Disease, May 2005, 1740(2):305-312.
Sabine Contreras: "The Dog Food Project—Vitamins," Mar. 2006, Retrieved from Internet: http://www.dogfoodproject.com/index.php?page=vitamins.
Kim, Su-Jin et al., "Resveratrol, Purified from the Stem of *Vitis coignetiae* Pulliat, Inhibits Food Intake in C57BL/6J Mice," Archives of Pharmacal Research, vol. 33, No. 5, pp. 775-780.

* cited by examiner

PET FOOD COMPOSITIONS FOR INDUCING A SATIETY RESPONSE

FIELD OF THE INVENTION

The present invention relates to the dietary control of appetite in animals, particularly companion animals, such as cats. Pet food, pet food additives and methods of feeding are provided which allow a caregiver to dispense larger quantities of food than should be consumed by the animal in one meal with the result that the animal consumes an appropriate dietary amount without the need for intervention by the caregiver to remove the food from the animal's area or otherwise deny the animal access to the source of food between feeding times.

BACKGROUND OF THE INVENTION

Excessive food intake and its deleterious effects on body mass are well known. Over time, excessive food intake produces a net caloric surplus that is stored in the fat of the animal. The accumulation of excess body fat has negative consequences both on the gross level, such that the overall appearance of the animal does not conform to generally accepted morphological standards, and on the metabolic level, such that the overall health prospects of the animal may be compromised, i.e., due to stress on organ systems in the case of morbid obesity and its co-morbid conditions, such as diabetes.

Nutritional approaches that are based upon restricting the caloric intake of animals are known to have positive effects on health and average body weight. However, these approaches require active intervention on the part of humans to dispense a controlled amount of food at defined intervals. Otherwise, animals given continuous access to a food source (fed "ad libitum") will continue consumption until the onset of satiety. However, the onset of satiety in response to food consumption is usually a gradual or delayed response which will routinely lead to consumption of more than the desired caloric limit.

Most companion animal diets that are currently on the market rely on calorie control as the means to weight loss. This approach essentially relies on brute force to control weight and relies heavily on compliance from the animal's guardian to ensure that the animal gets exactly what is required and no more. In essence, a companion animal fed ad libitum on a diet that relies on calorie restriction will still gain weight.

In a review by Kamiji and Inui (Endocrine Reviews, 28(6):664-684) the authors stated that NPY is a 36-amino acid neuropeptide member of the pancreatic polypeptide (PP) family. That includes Peptide YY (PYY) and PP. NPY is the most abundant and widely distributed peptide in the central nervous system of both rodents and humans. Within the hypothalamus, NPY plays an essential role in the control of food intake and body weight. Centrally administered NPY causes robust increases in food intake and body weight and, with chronic administration, can eventually produce obesity.

The biological actions of NPY are mediated by receptors derived from three Y receptor genes leading to the Y1, Y2 and Y5 subfamilies. All three play a role in the regulation of feeding behavior. Recent studies have shown that when NPY expression in the hypothalamus was inhibited, the treated animals released 50% less NPY, gained less weight and ate less than the controls up to 50 days after treatment (Beck, B., Phil. Trans. R, Soc. B (2006) 361, 1159-1185).

The most important factor that influences the hypothalamic content of NPY is food deprivation. Chronic food restriction induces similar changes and refeeding rapidly returns the abundance of NPY in the hypothalamus to initial values. Blood glucose concentrations also influence the expression of NPY. Furthermore, decreasing leptin levels in the blood by fasting leads to an increase in NPY expression. Additionally, gene therapy that restores leptin receptor expression in a model rat leads to a significant reduction in NPY mRNA levels pointing to a link between the leptin receptor and NPY expression (Beck, B., Phil. Trans. R, Soc. B (2006) 361, 1159-1185).

BRIEF SUMMARY OF THE INVENTION

The invention provides ingredients and pet food compositions which induce a satiety response in animals upon consumption of an effective dose.

In a further embodiment, the invention provides pet food compositions comprising a satiety inducing agent in an amount effective to induce the satiety response upon the consumption of a caloric intake appropriate to the age and weight of the animal.

This concept rests on the idea of making companion animals, particularly cats, want to eat less. The advantages over calorie restriction are many. The cat would self-regulate and comply without interference from the guardian. Furthermore, the food could be offered ad libitum because even if it is offered beyond what is recommended based on calories, the cat would not have the appetite to consume more.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

The following description of the preferred embodiments is merely exemplary in nature and is in no way intended to limit the invention, its application, or uses.

The targets for this diet are the hormone NPY and its receptors, and leptin and its receptors. Applicants have identified ingredients that modulate gene expression of NPY, leptin, and/or their receptors, and are thus useful as satiety inducing agents in pet food.

Satiety refers to satisfaction of the need for nutrition and the extinguishment of the sensation of hunger, which is often described as "feeling full". The satiety response refers to behavioral characteristics observed to be consistent with having consumed a sufficient amount of food, such as an abrupt or a tapered down cessation of eating. However, the biological mechanisms which lead to the satiety response are often triggered in a gradual or delayed manner, such that they are usually out of phase with the amount of food taken in by the animal prior to cessation, which results in the animal consuming more nutritional content than is appropriate for the animal. Satiety inducing agents produce an accelerated onset of the satiety response, i.e., pet food compositions containing satiety inducing agents will trigger the satiety response at an earlier point in time than would a similar pet food composition without the satiety inducing agent.

The invention thus provides in one embodiment, a pet food composition (Composition 1) comprising a satiety inducing agent in an amount effective to induce a satiety response, wherein the satiety inducing agent is effective to modulate expression of one or more of the hormone NPY and its receptors, and leptin and its receptors.

e.g., wherein the satiety inducing agent increases expression of leptin and/or its receptors, and/or wherein the satiety inducing agent decreases expression of NPY and/or its receptors;

e.g., wherein the genes modulated are selected from NPY, Peptide YY Y2 Receptor and NPY1R;

for example, a satiety inducing agent selected from beta-carotene, tomato powder and resveratrol;

or wherein the satiety inducing agent is selected from beta-carotene, tomato powder and resveratrol, and the animal is a cat.

The invention further provides a method of inducing a satiety response comprising feeding the animal an effective amount of the pet food composition of Composition 1, e.g., wherein the pet food composition is formulated to deliver the nutritional requirements of animals in the size and age class appropriate to the animal.

The invention further provides a pet food composition ingredient effective to control the amount of food intake of an animal, selected from the group consisting of beta-carotene, tomato powder and resveratrol.

The invention further provides the use of a pet food composition ingredient selected from the group consisting of beta-carotene, tomato powder and resveratrol to control the amount of food intake of an animal, or in the manufacture of a pet food to induce a satiety response of an animal.

The invention further provides a method of controlling the amount of food intake of an animal comprising feeding a pet food composition comprising one or more satiety inducing agents selected from the group consisting of beta-carotene, tomato powder and resveratrol, wherein the satiety inducing agents are present such that the animal stops feeding when the appropriate nutritional content is consumed.

Compositions of the present invention (particularly foods) can be prepared in a canned or wet form using conventional pet food processes. Typical requirements for a nutritionally adequate food composition are: carbohydrate, 0 to about 90%, illustratively about 5% to about 45%, by weight; protein, about 5% to about 70%, illustratively about 10% to about 60%, by weight; fat, about 2% to about 50%, illustratively about 5% to about 40%, by weight; total dietary fiber, about 0.1% to about 20%, illustratively about 1% to about 11%, by weight; and nutritional balancing agents such as vitamins and minerals, 0 to about 15%, illustratively about 2% to about 8%, by weight. To these ingredients are added one or more satiety inducing agents in accordance with the invention.

Vitamins and minerals should be included in amounts required to avoid deficiency and maintain health. AAFCO provides recommendations for cats in the American Feed Control Officials, Inc. Official Publication (2003), at pp. 126-240.

The effective amount of satiety inducing agent is determined by one skilled in the art by conducting a designed set of experiments in which animals are fed a selected range of satiety inducing agent. The ranges of satiety inducing agent should be adjusted for animal body weight, and separate tests can be conducted for animals in the conventional weight classes for the animal to determine amounts to formulate into a finished pet food composition. For example, in the case of cats, food is generally prepared according to different specifications for cats of different age classes. For example, according to a typical feeding system, kitten denotes a cat under one year, adult indicates ages of one to six years and mature adult refers to cats of seven years and older.

Suitable starting point amounts of the satiety inducing agents can also be calculated based upon cell line screening data, such as that provided in Example 1. An estimate of a suitable starting point, for example, can be calculated as follows: Take the weight of a cat in kilograms and multiply by a factor of 0.6 to arrive at an estimate of the amount of liters of water present in the cat (the density of water is 1). Using the amount tested in the cell line, assume 100% dissolves in the water, and multiply the amount tested in the cell lines by the amount of liters of water present in the cat. For a 1 kg cat: 1 kg×0.6 L/kg=0.6 Liters=600 mL. A suitable amount of the ingredient would=0.05 mg/mL×(600 mL)=30 mg. Exemplary amounts for beta-carotene, tomato powder and resveratrol are shown in Tables 1-3:

TABLE 1

Beta-Carotene

| Weight (kg) | Amount tested (ng/mL) | Effective amount in composition (mg) |
| --- | --- | --- |
| 1 | 0.003, 0.03 | 1.8, 18 |
| 2 | 0.003, 0.03 | 3.6, 36 |
| 3 | 0.003, 0.03 | 5.4, 54 |
| 4 | 0.003, 0.03 | 7.2, 72 |
| 5 | 0.003, 0.03 | 9, 90 |
| 6 | 0.003, 0.03 | 10.8, 108 |
| 7 | 0.003, 0.03 | 12.6, 126 |
| 8 | 0.003, 0.03 | 14.4, 144 |
| 9 | 0.003, 0.03 | 16.2, 162 |
| 10 | 0.003, 0.03 | 18, 80 |
| 11 | 0.003, 0.03 | 19.8, 198 |
| 12 | 0.003, 0.03 | 21.6, 216 |
| 13 | 0.003, 0.03 | 23.4, 234 |
| 14 | 0.003, 0.03 | 25.2, 252 |
| 15 | 0.003, 0.03 | 27, 270 |

TABLE 2

Tomato Powder

| Weight (kg) | Amount tested (mg/mL) | Effective amount in composition (mg) |
| --- | --- | --- |
| 1 | 0.05, 0.5 | 30, 300 |
| 2 | 0.05, 0.5 | 60, 600 |
| 3 | 0.05, 0.5 | 90, 900 |
| 4 | 0.05, 0.5 | 120, 1200 |
| 5 | 0.05, 0.5 | 150, 1500 |
| 6 | 0.05, 0.5 | 180, 1800 |
| 7 | 0.05, 0.5 | 210, 2100 |
| 8 | 0.05, 0.5 | 240, 2400 |
| 9 | 0.05, 0.5 | 270, 2700 |
| 10 | 0.05, 0.5 | 300, 3000 |
| 11 | 0.05, 0.5 | 330, 3300 |
| 12 | 0.05, 0.5 | 360, 3600 |
| 13 | 0.05, 0.5 | 390, 3900 |
| 14 | 0.05, 0.5 | 420, 4200 |
| 15 | 0.05, 0.5 | 450, 4500 |

TABLE 3

| | Reseveratrol | |
|---|---|---|
| Weight (kg) | Amount tested (mg/mL) | Effective amount in composition (mg) |
| 1 | 0.005, 0.05 | 3, 30 |
| 2 | 0.005, 0.05 | 6, 60 |
| 3 | 0.005, 0.05 | 9, 90 |
| 4 | 0.005, 0.05 | 12, 120 |
| 5 | 0.005, 0.05 | 15, 150 |
| 6 | 0.005, 0.05 | 18, 180 |
| 7 | 0.005, 0.05 | 21, 210 |
| 8 | 0.005, 0.05 | 24, 240 |
| 9 | 0.005, 0.05 | 27, 270 |
| 10 | 0.005, 0.05 | 30, 300 |
| 11 | 0.005, 0.05 | 33, 330 |
| 12 | 0.005, 0.05 | 36, 360 |
| 13 | 0.005, 0.05 | 39, 390 |
| 14 | 0.005, 0.05 | 42, 420 |
| 15 | 0.005, 0.05 | 45, 450 |

Effective amounts of beta-carotene for an animal weighing 1 kg to 15 kg are in the range of 1.8 mg to 270 mg. An effective amount for an animal weighing less than 1 kg or more than 15 kg can be calculated as described above.

Effective amounts of tomato powder for an animal weighing 1 kg to 15 kg are in the range of 30 mg to 4500 mg. An effective amount for an animal weighing less than 1 kg or more than 15 kg can be calculated as described above.

Effective amounts of resveratrol for an animal weighing 1 kg to 15 kg are in the range of 3 mg to 450 mg. An effective amount for an animal weighing less than 1 kg or more than 15 kg can be calculated as described above.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Example 1—Screening

Affymetrix Genechip Expression Analysis

Gene expression was analyzed using proprietary feline GeneChip® Arrays prepared by Affymetrix, Inc., Santa Clara, Calif. 95051. Total RNA is reverse transcribed into cDNA. The cDNA is used to generate cRNA which is fragmented and used as probes for GeneChip hybridization. The gene chip is washed and the hybridization signal is measured with an Affymetrix laser scanner. The hybridization data is then validated and normalized for further analysis.

Materials: Affymetrix provided most of the reagents and kit. Other reagents listed in the Affymetrix Manual but not supplied in the kit were obtained separately. Refer to GeneChip Expression Analysis Technical Manual (701021 Rev.4) for the details.

Equipment. Eppendorf Microcentrifuge, 1.5 mL DNase and RNase free/sterile microcentrifuge tubes, 50 mL DNase and RNase free/sterile disposable polypropylene tubes, P1000, P200, P20, P10 and P2 Rainin Pipetman pipettes, Filter pipette tips for P1000, P200, P20, P10 and P2 pipettes, DNase and RNase free/sterile, and Peltier Thermal Cycler PTC-200.

Procedure: All procedures followed exactly as described in GeneChip Expression Analysis Technical Manual (Affymetrix Copyright 1999-2003). 5 micrograms of total RNA were used for the first strand cDNA synthesis. Used either Peltier Thermal Cycler PTC-200 or heat block for temperature control on reactions and probe denaturing. The quality control was performed using RNA NanoDrop chips with BioAnalyer 2100. Used 100 Format (Midi Array) for the feline genechip.

Affymetrix gene chips are used to determine the effect of various test substances or ingredients on gene expression in four feline cell lines and appropriate controls. Each ingredient was tested in two concentrations as illustrated for selected sample ingredients shown in Table 4. The solvent at the higher of the two concentrations was used as a control. Four feline cell lines are used: CCL-150 (Lung), CCL-176 (Tongue), CRL-2032 (Brain), and CCL-94 (Kidney) (Obtained from The American Tissue Culture Collection). A cell line treated with an ingredient at a specific concentration is referred to as "treatment" and an untreated sample is referred to as "control." The words "genes" and "probes" are used synonymously in this method. Gene expression was measured for the treatment cell lines and controls. The gene expression data was determined to be either "up" or "down"-regulated for any given treatment. The decision on whether a gene is "up" or "down" is based on the fold change, which is calculated as treatment intensity/control intensity for each individual probe. The fold change is considered down-regulated if its value is <1/1.5 (for across all 4 cell lines analysis) or <1/2 (for within cell lines analysis) and is up-regulated if it is >1.5 (for across all 4 cell lines analysis) or >2 (for within cell lines analysis).

TABLE 4

| Gene Expression of Ingredient | | | |
|---|---|---|---|
| Gene Target | Ingredient | Fold Change | Amount Tested |
| NPY | Beta-Carotene | −1.75 (in two cell lines tested) | 0.003 mg/mL, 0.03 mg/mL |
| Peptide YY Y2 Receptor | Tomato Powder | −2.22) in two cell lines tested) | 0.05 mg/mL, 0.5 mg/mL |
| NPY1R | Tomato Powder | −1.54 (in two cell lines tested) | 0.05 mg/mL, 0.5 mg/mL |
| LEPR | Resveratrol | 1.96 (in all cell lines tested) | 0.005 mg/mL, 0.05 mg/mL |

What is claimed is:

1. A method of controlling the amount of food intake of a cat, the method comprising:
   feeding the cat a pet food composition comprising:
   0-90% by weight carbohydrate;
   5-70% by weight protein;
   2-50% by weight fat;
   0.1-20% by weight total dietary fiber;
   0-15% by weight vitamins and minerals; and
   a satiety inducing agent selected from beta-carotene and tomato powder in an amount effective to induce a satiety response so that the cat consumes an appropriate dietary amount of the pet food without being denied access to the source of food between feeding times,
   wherein the satiety inducing agent is effective to modulate expression of one or more genes selected from NPY, NPY receptors, leptin and leptin receptors, wherein if the satiety inducing agent is beta-carotene, the beta-carotene is present in an appropriate dietary amount of cat food for one meal based on the cats weight and age; and wherein if the satiety inducing agent is tomato powder, the tomato powder is present in an amount of 30 mg to 4,500 mg in an appropriate dietary amount of cat food for one meal based on the cats weight and age.

2. The method of claim 1, wherein satiety inducing agent is beta-carotene.

3. The method of claim 1, wherein satiety inducing agent is tomato powder.

4. The method of claim 1, wherein the beta-carotene is present in an amount of 1.8 mg to 270 mg.

* * * * *